(12) United States Patent
Nitta et al.

(10) Patent No.: US 11,654,553 B2
(45) Date of Patent: May 23, 2023

(54) ROBOT SYSTEM AND DRIVING METHOD

(71) Applicant: KABUSHIKI KAISHA TOSHIBA, Minato-ku (JP)

(72) Inventors: Shuhei Nitta, Ota (JP); Atsushi Yaguchi, Taito (JP); Yukinobu Sakata, Kawasaki (JP); Akiyuki Tanizawa, Kawasaki (JP); Yasutoyo Takeyama, Kawasaki (JP); Tomoki Watanabe, Inagi (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 508 days.

(21) Appl. No.: 16/799,955

(22) Filed: Feb. 25, 2020

(65) Prior Publication Data

US 2021/0060768 A1 Mar. 4, 2021

(30) Foreign Application Priority Data

Sep. 4, 2019 (JP) .............................. JP2019-161475

(51) Int. Cl.
*B25J 9/16* (2006.01)
*G06N 3/08* (2023.01)
(Continued)

(52) U.S. Cl.
CPC ............. *B25J 9/163* (2013.01); *B25J 9/1612* (2013.01); *G06N 3/047* (2023.01); *G06N 3/08* (2013.01); *G06N 5/04* (2013.01); *G06N 20/00* (2019.01)

(58) Field of Classification Search
CPC .......... B25J 9/163; B25J 9/1612; B25J 9/161; G06N 3/0472; G06N 3/08; G06N 5/04;
(Continued)

(56) References Cited

U.S. PATENT DOCUMENTS 10,058,995 B1 * 8/2018 Sampedro ................ B25J 9/163
10,776,691 B1 * 9/2020 Ghahramani .......... G06N 3/084
(Continued)

FOREIGN PATENT DOCUMENTS

| JP | 2017-30135 A | 2/2017 |
| JP | 2018-202550 A | 12/2018 |
| JP | 2021-12553 A | 2/2021 |

OTHER PUBLICATIONS

Yu, J. et al., "Universally Slimmable Networks and Improved Training Techniques," arXiv: 1903.05134v1 [cs.CV] Mar. 12, 2019, pp. 1-10.
(Continued)

*Primary Examiner* — Asghar H Bilgrami
(74) *Attorney, Agent, or Firm* — Oblon, McClelland, Maier & Neustadt, L.L.P.

(57) ABSTRACT

A robot system according to an embodiment includes one or more processors. The processors acquire first input data predetermined as data affecting an operation of a robot. The processors calculate a calculation cost of inference processing using a machine learning model for inferring control data used for controlling the robot, on the basis of the first input data. The processors infer the control data by the machine learning model set according to the calculation cost. The processors control the robot using the inferred control data.

9 Claims, 10 Drawing Sheets (51) Int. Cl.
  *G06N 5/04* (2023.01)
  *G06N 20/00* (2019.01)
  *G06N 20/10* (2019.01)
  *G06N 3/047* (2023.01)
(58) Field of Classification Search
  CPC ...... G06N 20/00; G06N 3/084; G06N 3/0454; G06N 20/10; G05B 2219/39311
  See application file for complete search history.

(56) References Cited

U.S. PATENT DOCUMENTS

| | | | | |
|---|---|---|---|---|
| 10,780,577 | B2* | 9/2020 | Murakami | B25J 9/163 |
| 10,981,272 | B1* | 4/2021 | Nagarajan | B25J 9/1669 |
| 11,106,967 | B2* | 8/2021 | Shankar | G06V 10/82 |
| 11,150,655 | B2* | 10/2021 | Zhou | G05D 1/0088 |
| 2013/0184867 | A1* | 7/2013 | Jang | B25J 9/1674 700/253 |
| 2017/0028562 | A1* | 2/2017 | Yamazaki | B25J 9/163 |
| 2018/0075402 | A1* | 3/2018 | Stadie | G05B 19/41895 |
| 2018/0099408 | A1* | 4/2018 | Shibata | B25J 9/1697 |
| 2018/0126558 | A1* | 5/2018 | Ooba | B25J 19/06 |
| 2018/0210432 | A1* | 7/2018 | You | B25J 9/1656 |
| 2018/0257225 | A1* | 9/2018 | Satou | B25J 9/1697 |
| 2019/0004518 | A1* | 1/2019 | Zhou | G05D 1/0088 |
| 2019/0291271 | A1* | 9/2019 | Hayashi | B25J 9/1664 |
| 2020/0001454 | A1* | 1/2020 | Iwasa | B25J 9/0081 |
| 2021/0012228 | A1 | 1/2021 | Yaguchi et al. | |
| 2021/0072734 | A1* | 3/2021 | Hirota | G06N 3/08 |
| 2021/0402598 | A1* | 12/2021 | Terasawa | B25J 9/1612 |

OTHER PUBLICATIONS

Chen, R. T. Q. et al., "Neural Ordinary Differential Equations," 32$^{nd}$ Conference on Neural Information Processing Systems (NeurIPS 2018), arXiv: 1806.07366v4 [cs.LG] Jan. 15, 2019, pp. 1-19.

* cited by examiner

ROBOT SYSTEM AND DRIVING METHOD

CROSS-REFERENCE TO RELATED APPLICATIONS

This application is based upon and claims the benefit of priority from Japanese Patent Application No. 2019-161475, filed on Sep. 4, 2019; the entire contents of which are incorporated herein by reference.

FIELD

Embodiments described herein relate generally to a robot system and a driving method.

BACKGROUND

By using a neural network model that has been rapidly developed in recent years, a picking robot with high precision can be realized. For example, a technique relating to a learning method for a picking robot using a neural network model has been proposed.

However, in the related art, in some cases, the inference accuracy and the calculation cost that are in a trade-off relationship cannot be adjusted appropriately. For example, in order to realize more accurate inference processing, a model having a large number of parameters and a large number of multiplications is required, which may increase the calculation cost.

DETAILED DESCRIPTION

According to one embodiment, a robot system according to an embodiment includes one or more processors. The processors acquire first input data predetermined as data affecting an operation of a robot. The processors calculate a calculation cost of inference processing using a machine learning model for inferring control data used for controlling the robot, on the basis of the first input data. The processors infer the control data by the machine learning model set according to the calculation cost. The processors control the robot using the inferred control data.

Hereinafter, embodiments of a robot system and a driving method will be described in detail with reference to the accompanying drawings. First, a configuration example of an inference device and an inference system applicable to a robot system will be described in the first embodiment and the second embodiment. In the third embodiment, a configuration example of a robot system to which the inference device of the first embodiment, the inference system of the second embodiment, or another inference device (inference system) is applied will be described.

First Embodiment

In the first embodiment, a case where a multilayer neural network is used as a machine learning model will be described as an example. The machine learning model is not limited to a multilayer neural network, and may be another model such as a support vector machine. In addition, although the neural network will be described as a fully connected type, it may be a convolution type. In the description of the first embodiment, a tensor of a weight coefficient will be described as a matrix (a tensor of Rank 2). In the case of the convolution type, a tensor of Rank 4 of horizontal width×vertical width×input channel×output channel can be converted into a matrix such as (horizontal width×vertical width×input channel)×output channel. A case where a model size is directly acquired as a control parameter will be described. The model size may be determined based on desired hardware performance such as power consumption and memory capacity.

Example of Functional Configuration

Figure 1:
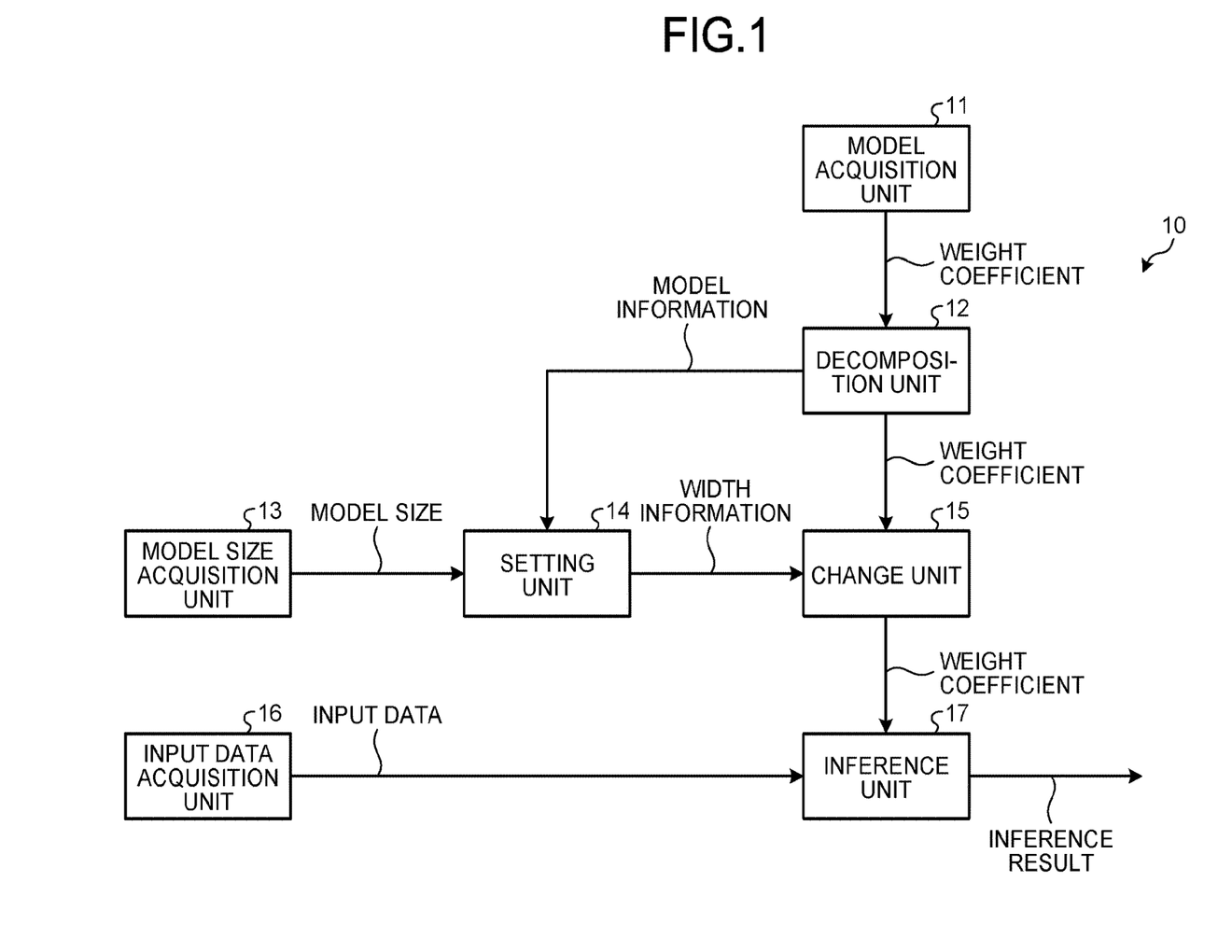
FIG. 1 is a diagram illustrating an example of a functional configuration of an inference device according to a first embodiment.

FIG. 1 is a diagram illustrating an example of a functional configuration of an inference device 10 according to the first embodiment. The inference device 10 of the first embodiment includes a model acquisition unit 11, a decomposition unit 12, a model size acquisition unit 13, a setting unit 14, a change unit 15, an input data acquisition unit 16, and an inference unit 17.

The model acquisition unit 11 acquires a machine learning model. The model acquisition unit 11 acquires a machine learning model from a learning device, for example. The learning device will be described in the second embodiment.

The decomposition unit decomposes the tensor of the weight coefficient of the machine learning model (first machine learning model) into two or more tensors (decomposition tensor) by a tensor decomposition method. In the first embodiment, the decomposition unit 12 decomposes a weight matrix W of the machine learning model acquired by the model acquisition unit 11.

Figure 2:
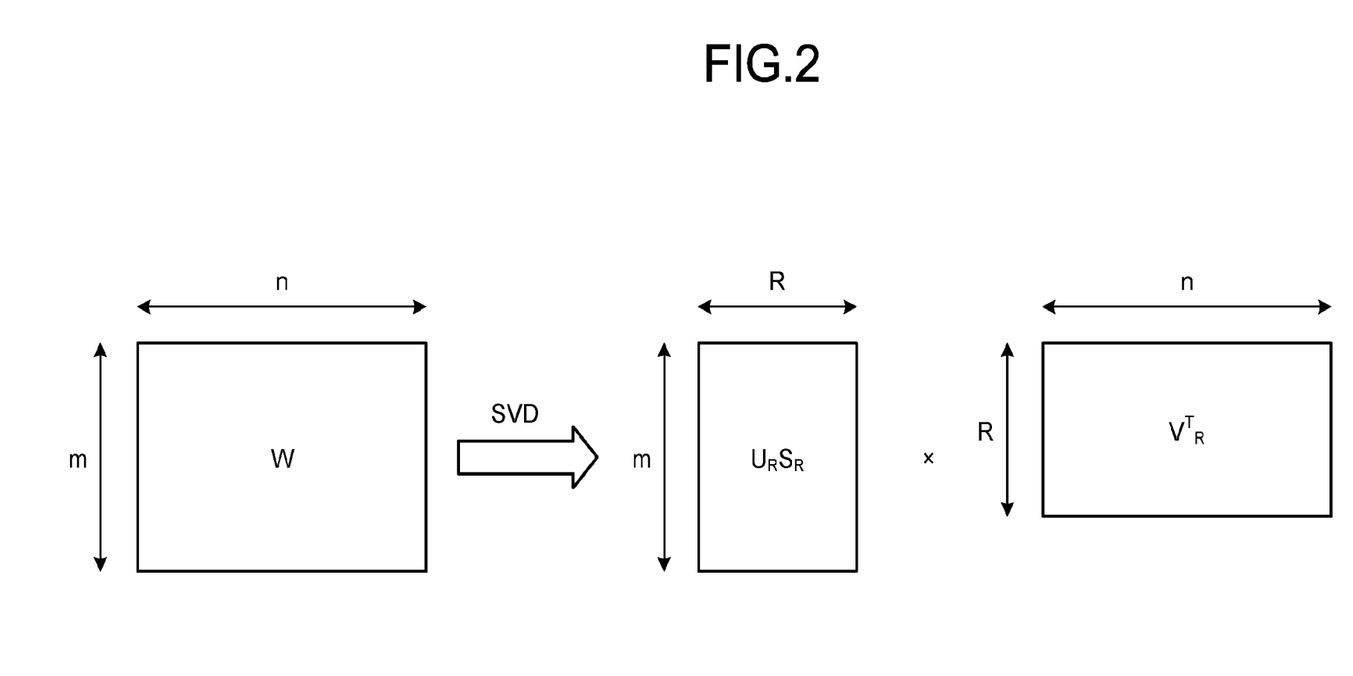
FIG. 2 is a diagram illustrating an example of decomposition processing of a decomposition unit according to the first embodiment.

FIG. 2 is a diagram illustrating an example of decomposition processing of the decomposition unit 12 according to the first embodiment. The example of FIG. 2 illustrates a case where a weight matrix W having an m×n size is decomposed into two matrices having a width R. Each component of the weight matrix W represents a real-valued weight. The decomposition method performs decomposition as illustrated in FIG. 2 using, for example, singular value decomposition (SVD). Note that the decomposition unit 12 may decompose the weight matrix W into three or more matrices using other decomposition methods.

The decomposition unit 12 determines R in a range of 1≤R≤min(m,n). Specifically, R is the number of basis vectors (each column of US or each row of $V^T$) that remain after deletion of basis vectors having low contribution. The contribution $\alpha_1$ of j (=1, . . . , min(m,n))-th basis vector is calculated based on the magnitude of the singular value, for example. In the first embodiment, the contribution $\alpha_j$ is calculated using Equation (1) that normalizes the singular value with the maximum value.

$$\alpha_j = \frac{\sigma_j}{\max_{i=1,\ldots,\min(m,n)} \sigma_i} \in [0, 1] \quad (1)$$

Here, $\sigma_j$ represents the singular value of the j-th basis vector (diagonal components of a diagonal matrix S). In addition, dispersion criteria, information amount criteria, discrimination criteria, or the like may be used as the contribution. The decomposition unit 12 inputs model information including the contribution and the number of parameters of each of R bases to the setting unit 14. The number of parameters is the sum of the number of components (weight coefficients) mR of the weight matrix $U_R S_R$ and the number of components Rn of the weight matrix $V_R^T$. Also, the decomposition unit 12 inputs the weight coefficients of the decomposed weight matrices (the weight coefficients of the weight matrix $U_R S_R$ and the weight coefficients of the weight matrix $V_R^T$) to the change unit 15.

In a case where the machine learning model has a plurality of weight matrices W, such as a case where the neural network has a plurality of layers, the above-described decomposition processing may be performed on each of the weight matrices W. Note that the decomposition processing of the decomposition unit 12 only needs to be performed once on the machine learning model input from the model acquisition unit 11.

Returning to FIG. 1, when the model size acquisition unit 13 acquires the model size of the machine learning model, the model size acquisition unit 13 inputs the model size to the setting unit 14. The model size is a size of the machine learning model (second machine learning model) generated by the change unit 15. The model size is an example of a control parameter for controlling the hardware performance of the inference device 10. A case where the control parameter is a model size will be described as an example in the first embodiment, but the control parameter is not limited to the model size. The control parameter includes, for example, at least one of a model size, a calculation amount, inference accuracy, an inference speed, power consumption, a memory amount, and a memory bandwidth.

The setting unit 14 sets the width of the decomposition tensor of the tensor of the weight coefficient according to the model size. In the first embodiment, the setting unit 14 sets a width r (1≤r≤R) of $(U_r S_r) V_r^T$ as a width r of the weight matrix W every time the model size is input from the model size acquisition unit 13, and inputs width information indicating the width r of the weight matrix W to the change unit 15.

Figure 3:
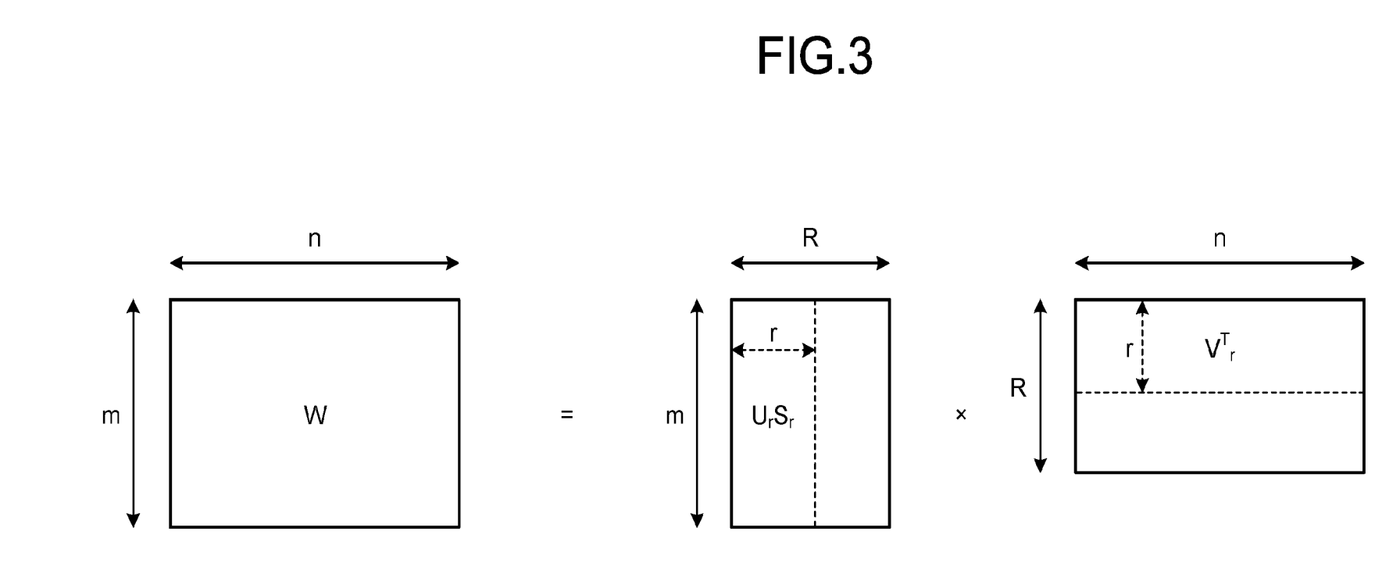
FIG. 3 is a diagram for describing the width of a weight matrix according to the first embodiment.

FIG. 3 is a diagram for describing the width r of the weight matrix W according to the first embodiment. The width r of the weight matrix W is determined by the number of columns r of the decomposed weight matrix $U_R S_R$ (number of rows r of the decomposed weight matrix $V_R^T$). The setting unit 14 selects r (1≤r≤R) basis vectors from the R basis vectors, thereby setting the width of the decomposition tensor (the weight matrix $U_r S_r$ and the weight matrix $V_r^T$ in FIG. 3). Specifically, the setting unit 14 adds the basis vectors from the basis vectors having higher contribution $\alpha_j$ on the basis of the model information input from the decomposition unit 12, and increases the width r of the weight matrix W until the target model size is reached. Alternatively, the setting unit 14 deletes the basis vector from the basis vector having low contribution $\alpha_j$, and reduces the width r of the weight matrix W until the target model size is reached.

In a case where the machine learning model has a plurality of weight matrices W, the setting unit 14 may set the width r independently until each weight matrix W has the target size. In this case, if the number of parameters of each weight matrices W is the same, the width r is uniform. Alternatively, the setting unit 14 may set the width r after arranging the basis vectors included in the plurality of weight matrices W in a line in a descending order or an ascending order of contribution. In this case, since the width r of the weight matrix W including the basis vector having high contribution is preferentially increased, the width r becomes non-uniform even if the number of parameters of each weight matrix W is the same.

Figure 4A:
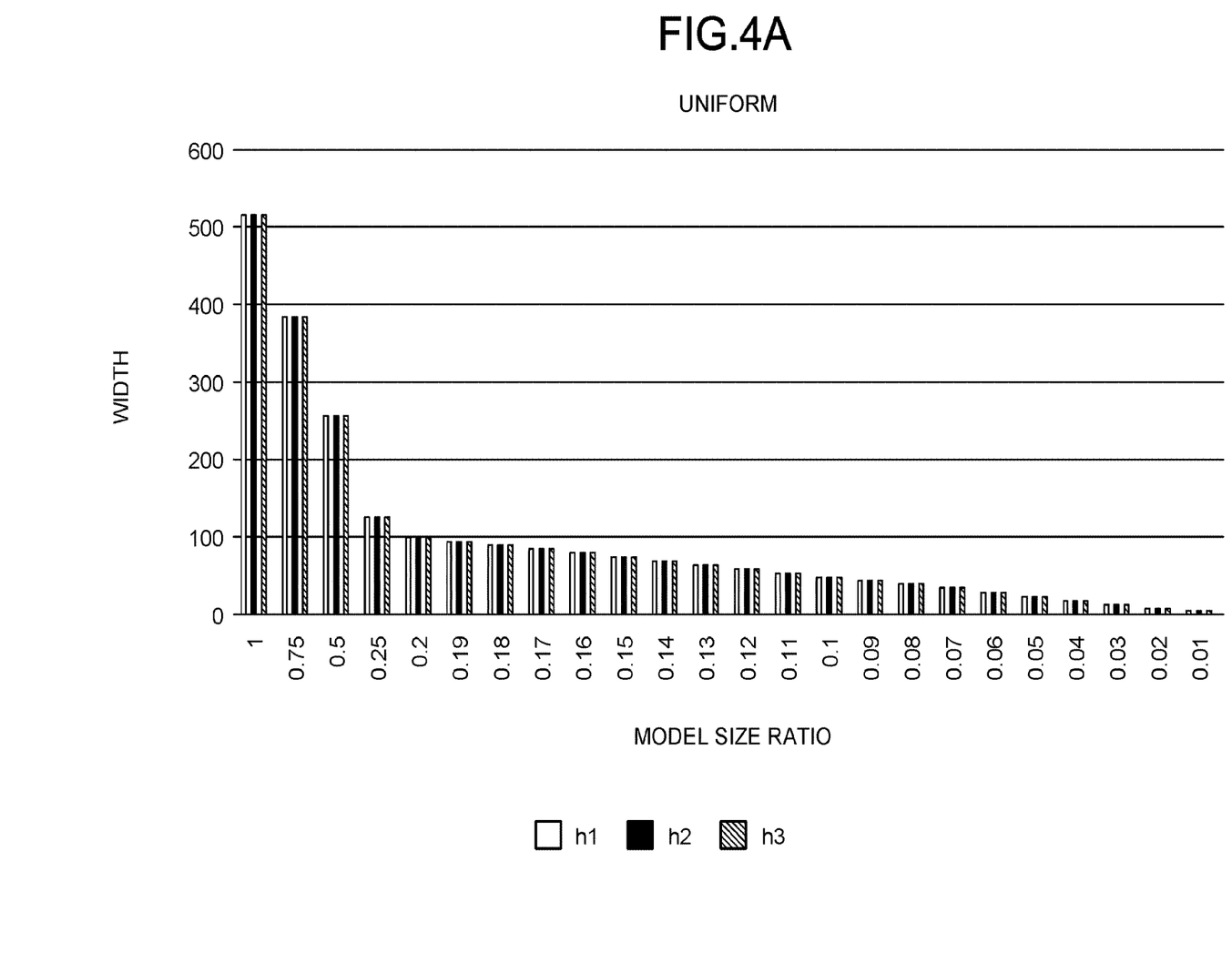
FIG. 4A is a diagram illustrating a setting example (uniform case) of a width r according to the first embodiment.
Figure 4B:
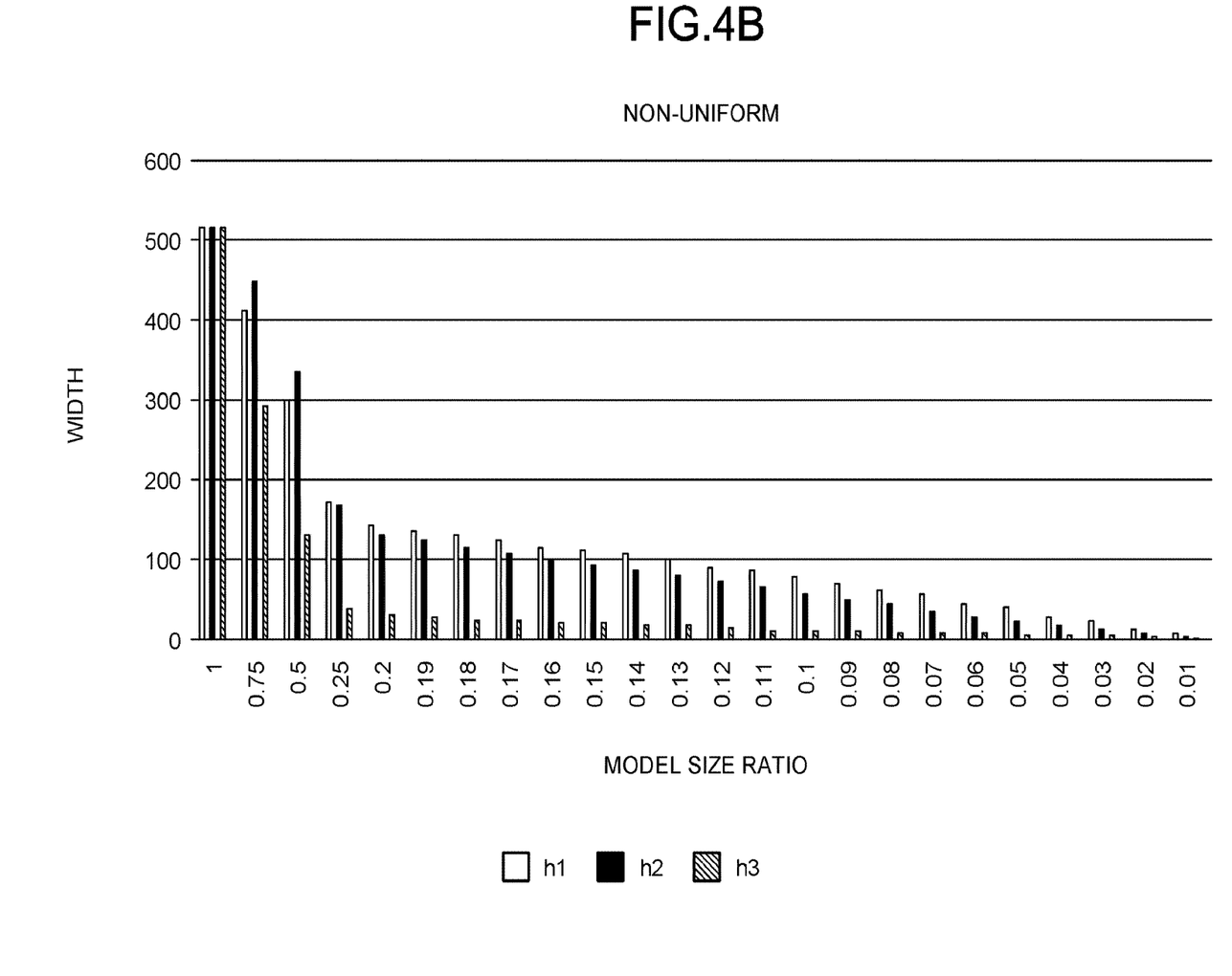
FIG. 4B is a diagram illustrating a setting example (non-uniform case) of the width r of the first embodiment.

FIG. 4A is a diagram illustrating a setting example (uniform case) of the width r according to the first embodiment. FIG. 4B is a diagram illustrating a setting example (non-uniform case) of the width r of the first embodiment. The example of FIGS. 4A and 4B illustrates a case where the width r of the neural network including three intermediate layers having 512 nodes is set. h1 to h3 indicate the hierarchies of the intermediate layers. In the non-uniform method, as illustrated in FIG. 4B, the width r is increased as the layer has higher contribution (layer corresponding to the weight matrix W including more basis vectors having higher contribution). The relationship between the width r of each weight matrix W and the model size may be tabulated and held in the inference device 10. FIGS. 4A and 4B illustrate the case of the neural network including three intermediate layers, but the number of intermediate layers may be arbitrary.

Returning to FIG. 1, the change unit 15 changes the first machine learning model to the second machine learning model according to the control parameter. Specifically, the change unit 15 changes the machine learning model (first machine learning model) to a machine learning model (second machine learning model) represented by two or more decomposition tensors having a width set by the setting unit 14. In the first embodiment, the change unit 15 changes the width r of the weight matrix W every time the width information indicating the width r (1≤r≤R) is input from the setting unit 14, and inputs the changed model (weight coefficient) to the inference unit 17. Thereby, the number of parameters of the weight matrix W (number of weight coefficients) can be changed within a range of (m+n)≤(m+n)r≤(m+n)R.

Figure 5:
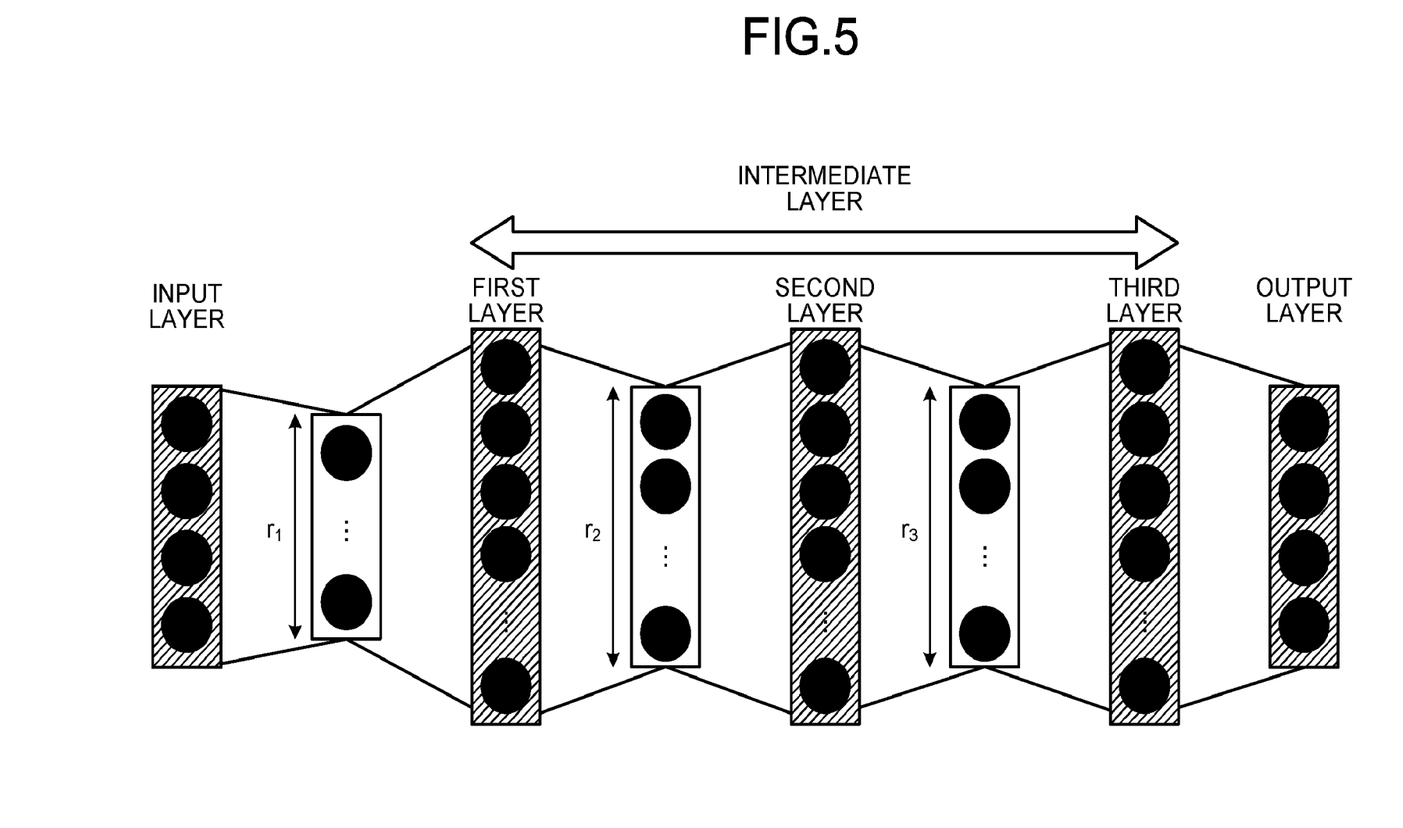
FIG. 5 is a diagram illustrating an example of change processing of a change unit according to the first embodiment.

FIG. 5 is a diagram illustrating an example of change processing of the change unit 15 according to the first embodiment. The example of FIG. 5 illustrates a case where the width of the neural network including three intermediate layers is changed. In this case, each of the weight matrices W connected to the first layer, the second layer, and the third layer is decomposed into the weight matrices US and $V^T$ by the above-described decomposition processing. The change unit 15 changes the machine learning model by changing the weight matrix W connected to the first layer to the weight matrices US and $V^T$ having a width $r_1$, changing the weight matrix W connected to the second layer to the weight matrices US and $V^T$ having a width $r_2$, and changing the weight matrix W connected to the third layer to the weight matrices US and $V^T$ having a width $r_3$.

Further, in a case where the model has normalization processing, the change unit 15 corrects the influence of the width change by changing the parameter of the normalization processing on the basis of the width r ($1 \leq r \leq R$). For example, in a case where the machine learning model includes a normalization layer that performs normalization processing, the change unit 15 corrects the parameter used in the normalization processing according to the width set by the setting unit 14. In the first embodiment, a case where the mean and variance parameters are corrected when the neural network has a Batch normalization layer will be described.

The Batch normalization layer normalizes the vector y after projection of the input x by the weight matrix W as follows.

$$y = W^T x \quad (2)$$

$$\tilde{y} = \Gamma Z^{-\frac{1}{2}}(y - \mu) + \beta \quad (3)$$

$$\Gamma = \text{diag}(\gamma_1, \gamma_2, \ldots, \gamma_n) \quad (4)$$

$$Z = \text{diag}(\sigma_1^2, \sigma_2^2, \ldots, \sigma_n^2) \quad (5)$$

Here, $\Gamma$ and $\beta$ are scale and bias parameters determined by learning, and $\mu$ and Z are average and variance parameters determined by learning. The change unit 15 calculates correction values $\mu r$ and $Zr$ of $\mu$ and Z using the width r as follows.

$$\mu_r = (V_r V_r^T) \mu \quad (6)$$

$$\Sigma_r = (V_r V_r^T) \Sigma (V_r V_r^T) \quad (7)$$

$$Z_r = \text{diag}(\Sigma_r) \quad (8)$$

Here, $\Sigma$ is a covariance matrix of y calculated using the learning sample. Zr is a diagonal matrix obtained by extracting only the diagonal components of $\Sigma r$.

As described above, in the inference of the neural network, in the inference device 10 of the first embodiment, the decomposition unit 12 divides the matrix W of the weight coefficients of the machine learning model into a plurality of matrices using the matrix decomposition method. The change unit 15 transforms the matrix on the basis of the width r of the matrix specified at the time of inference. In a case where the neural network has a normalization layer, the parameters of the normalization layer are changed according to the width r specified at the time of inference. According to the first embodiment, by controlling the width r, the machine learning model can be changed to an arbitrary model size while maintaining the inference accuracy as much as possible.

Returning to FIG. 1, the input data acquisition unit 16 acquires input data such as an image.

The inference unit 17 performs the inference processing and outputs a result each time the input data is input from the input data acquisition unit 16. The inference processing here represents forward propagation of the neural network. The inference unit 17 continues to use the same machine learning model for the input unless the machine learning model (weight coefficient) changed from the change unit 15 is input.

As described above, in the inference device 10 of the first embodiment, the decomposition unit 12 decomposes the tensor (the weight matrix W in the first embodiment) of the weight coefficient of the first machine learning model into two or more decomposition tensors by the tensor decomposition method. The model size acquisition unit 13 acquires the model size of the machine learning model. The setting unit 14 sets the width of the decomposition tensor according to the model size. The change unit 15 changes the first machine learning model to the second machine learning model represented by two or more decomposition tensors having a width set by the setting unit 14. The inference unit 17 uses the second machine learning model to make an inference according to the input data.

Thereby, according to the inference device 10 of the first embodiment, the machine learning model can be changed to an arbitrary size while suppressing a decrease in inference accuracy.

Second Embodiment

Next, a second embodiment will be described. In the second embodiment, the same description as in the first embodiment is omitted. In the second embodiment, a case where a multilayer neural network is used as a machine learning model will be described as an example. The machine learning model is not limited to a multilayer neural network, and may be another model such as a support vector machine. The tensor of the weight coefficient will be described as a matrix (a tensor of Rank 2). A case where a model size is used as a control parameter will be described. The model size may be determined based on desired hardware performance such as power consumption and memory capacity.

Example of Device Configuration

Figure 6:
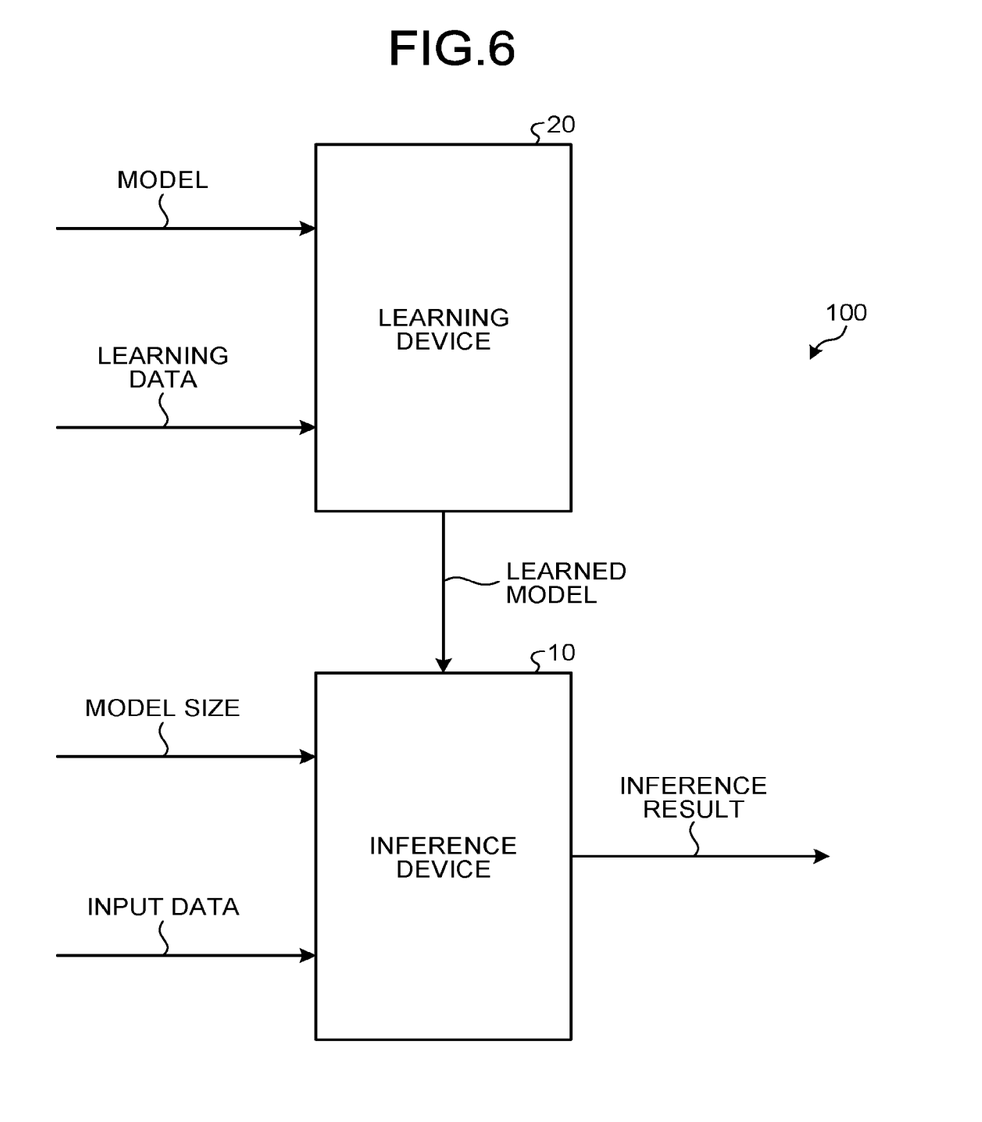
FIG. 6 is a diagram illustrating an example of a device configuration of an inference system according to a second embodiment.

FIG. 6 is a diagram illustrating an example of a device configuration of an inference system 100 according to the second embodiment. The inference system 100 of the second embodiment includes an inference device 10 and a learning device 20. Since the description of the inference device 10 is the same as that of the first embodiment, the description thereof will be omitted. The learning device 20 performs machine learning on the model based on the learning data, and inputs the learned model to the inference device 10. In the second embodiment, the inference system 100 including the inference device 10 and the learning device 20 will be described. However, the learning device 20 alone may constitute the system.

Example of Functional Configuration

Figure 7:
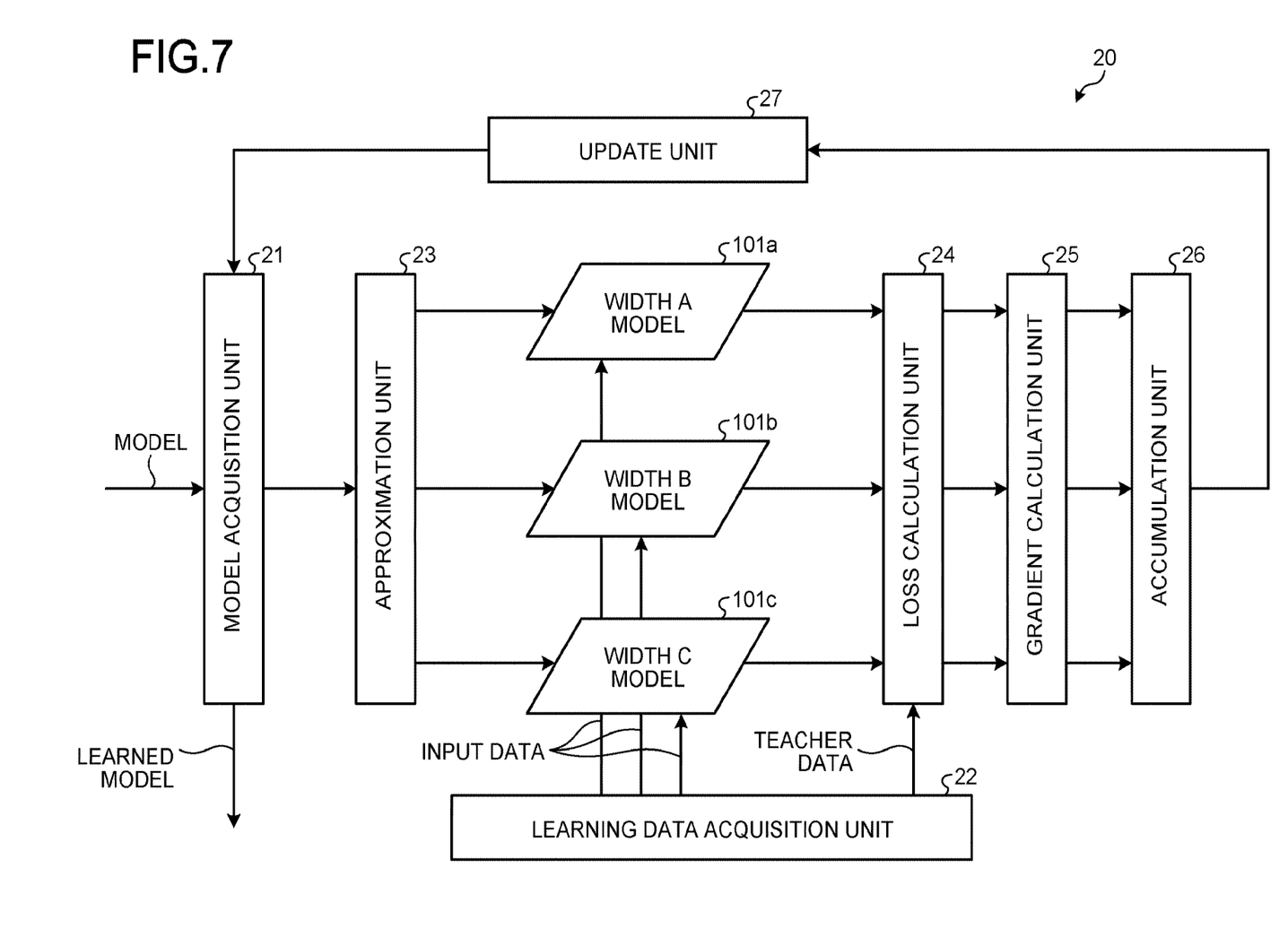
FIG. 7 is a diagram illustrating an example of a functional configuration of a learning device according to the second embodiment.

FIG. 7 is a diagram illustrating an example of a functional configuration of the learning device 20 according to the second embodiment. The learning device 20 of the second embodiment includes a model acquisition unit 21, a learning data acquisition unit 22, an approximation unit 23, a loss calculation unit 24, a gradient calculation unit 25, an accumulation unit 26, and an update unit 27.

At the start of learning, the model acquisition unit 21 receives a model from the outside and initializes the model. Further, the model acquisition unit 21 receives the model updated in each step during learning. Further, the model acquisition unit 21 inputs the learned model to the inference device 10 at the end of learning.

The learning data acquisition unit 22 receives learning data from the outside at the start of learning. The learning data includes model input data and supervised data. The supervised data indicates the output data (correct answer label) of the model corresponding to the input data. The learning data acquisition unit 22 inputs all or part of the input data to a width A model 101*a* to a width C model 101*c* and inputs all or part of the supervised data to the loss calculation unit 24 in each step during learning.

The approximation unit 23 approximates the weight matrix W having the m×n size to a weight matrix $W_r$ having a lower rank. As an approximation method, for example, the singular value decomposition described above is used to obtain $Wr=U_r S_r V_r^T$. For the order r (the above-described width r), a value predetermined within a range of 1≤r≤min (m,n), a value calculated using a cumulative contribution ratio or the like, and a value selected at random are used.

In a case where the model has a plurality of weight matrices W, the approximation unit 23 may approximate all the weight matrices W or may select and approximate some of the weight matrices W. When selecting the r bases included in the weight matrix $W_r$, the basis having high contribution determined on the basis of the singular value or the like may be selected in the same manner as in the setting unit 14 of the first embodiment. The approximation unit 23 generates a plurality of approximate models having different ranks r from a single model by the above-described approximation method. The number of approximate models is not limited to three and may be arbitrary.

In the example of FIG. 7, the approximation unit 23 generates the width A model 101a to the width C model 101c as approximate models. The width A model 101a is a model represented by a weight matrix $W_A$ having a width r=A. The width B model 101b is a model represented by a weight matrix $W_B$ having a width r=B. The width C model 101c is a model represented by a weight matrix $W_c$ having a width r=C. The approximate model performs processing by sharing all parameters other than the respective weight matrices $W_A$ to $W_e$.

The loss calculation unit 24 calculates a loss function $L_i(D, W_{ri}, \Theta)$ (i=1, ..., M) for the approximate model of each rank ri (i=1, ..., M). Here, M is the number of models. For example, when three models illustrated in FIG. 7 are used, M is 3. D is learning data. $L_i$ is a loss function. For example, a cross-entropy function is used in the classification problems or the like. $W_{ri}$ represents a weight matrix of the approximate model of rank ri. $\Theta$ represents all learnable parameters except $W_{ri}$. Note that a regularization function such as $L_2$ regularization of weights may be added to the loss function.

The gradient calculation unit 25 calculates the gradient for each approximate model by differentiating the loss function using Equations (9) and (10).

$$\nabla_W^{(i)} = \frac{\partial \mathcal{L}_i(D, W_{r_i}, \Theta)}{\partial W} \quad (9)$$

$$\nabla_\Theta^{(i)} = \frac{\partial \mathcal{L}_i(D, W_{r_i}, \Theta)}{\partial \Theta} \quad (10)$$

Here, the differentiation with respect to the weight matrix W in Equation (9) is calculated with respect to the weight matrix W before approximation rather than the weight matrix $W_{ri}$ of each approximate model. Specifically, for example, the differentiation is calculated by Equation (11) or (12).

$$\frac{\partial \mathcal{L}_i(D, W_{r_i}, \Theta)}{\partial W} = U_{r_i} U_{r_i}^T \frac{\partial \mathcal{L}_i(D, W_{r_i})}{\partial W_{r_i}} \quad (11)$$

$$\frac{\partial \mathcal{L}_i(D, W_{r_i}, \Theta)}{\partial W} = \frac{\partial \mathcal{L}_i(D, W_{r_i})}{\partial W_{r_i}} V_{r_i} V_{r_i}^T \quad (12)$$

Here, $U_{ri}$ and $V_{ri}$ are matrices obtained when approximated to the rank ri.

The accumulation unit 26 accumulates the gradients of the approximate models and inputs the resultant to the update unit 27. Specifically, the accumulation unit 26 accumulates the gradients of the approximate models using Equations (13) and (14).

$$\nabla_W = \sum_{i=1}^{M} \alpha_i \nabla_W^{(i)} \quad (13)$$

$$\nabla_\Theta = \sum_{i=1}^{M} \beta_i \nabla_\Theta^{(i)} \quad (14)$$

Here, $\alpha_i$ (i=1, ..., M) and $\beta_i$ (i=1, ..., M) are coefficients representing weights of the respective losses. $\alpha_i$ and $\beta_i$ are, for example, predetermined values, values calculated according to the rank (width r) of each model, or values determined by learning progress. In a case where a regularization function such as $L_2$ regularization of weights is added to the loss function, the gradient of the regularization function is added to Equations (13) and (14).

The update unit 27 updates the parameters of the model to be learned by simultaneously minimizing the loss function for a plurality of approximate models using the gradients accumulated by the accumulation unit 26. The update method may be a stochastic gradient method such as momentum-SGD and Adam.

As described above, the inference system 100 according to the second embodiment includes the inference device 10 and the learning device 20. The inference device 10 changes the machine learning model to an approximate model having an arbitrary model size while maintaining the inference accuracy as much as possible by controlling the above-described width r (refer to FIG. 3).

In the learning device 20, the model acquisition unit 21 acquires a model to be learned. The approximation unit 23 decomposes the tensor of the weight coefficient of the model (weight matrix W in the second embodiment) into two or more decomposition tensors obtained by the tensor decomposition method, and approximates the model to a plurality of approximate models (the width A model 101a to the width C model 101c in the second embodiment) represented by a plurality of decomposition tensors having different widths. The learning data acquisition unit 22 acquires learning data including the input data and the supervised data, and inputs the input data to a plurality of approximate models. The loss calculation unit 24 calculates the loss function of each of the plurality of approximate models using the supervised data and the output data output from the plurality of approximate models according to the input data. The gradient calculation unit 25 calculates the gradient of each loss function. The accumulation unit 26 accumulates the gradients. Then, the update unit 27 updates the parameters of the model to be learned such that the loss functions of the plurality of approximate models are minimized on the basis of the accumulated gradients.

That is, assuming that the inference device 10 executes the approximate model with a plurality of matrix ranks (widths r), the learning device 20 learns the model while calculating the gradient of the loss function in the approximate model with a plurality of widths r. As a result, the machine learning model can be changed to an arbitrary size while maintaining the inference accuracy as much as possible.

Third Embodiment

Next, a third embodiment will be described. In the third embodiment, the same description as in the first embodiment and the second embodiment is omitted. In the third embodiment, a robot system that mainly controls the drive of a picking robot by estimating a gripping point of a product from a captured image obtained by imaging the product to be picked from above will be described as an example. In this case, the machine learning model is a model for inferring control data used for robot control, for example.

Figure 8:
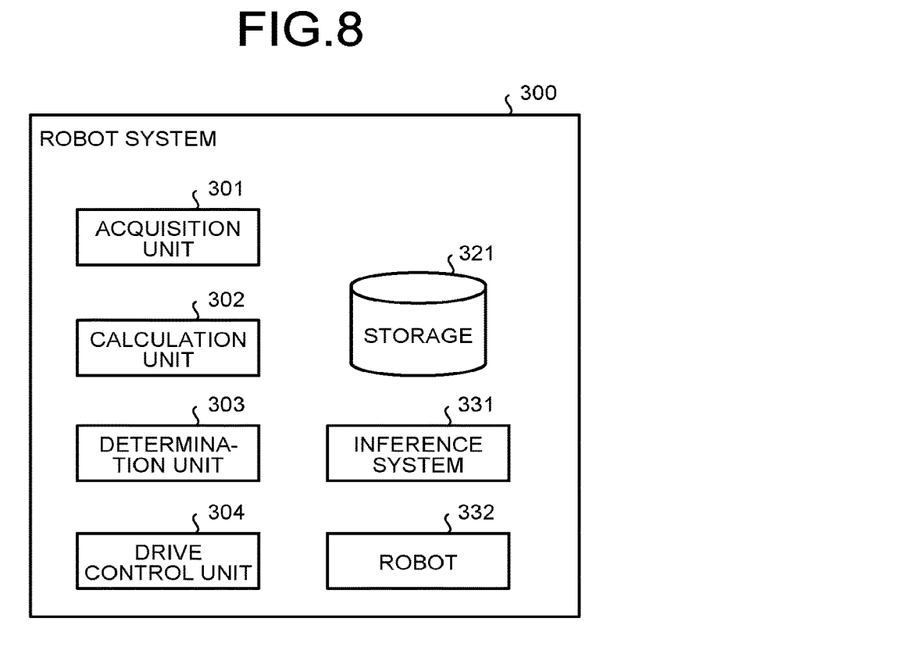
FIG. 8 is a block diagram of a robot system according to a third embodiment.

FIG. 8 is a block diagram illustrating a configuration example of a robot system 300 according to the third embodiment. As illustrated in FIG. 8, the robot system 300 includes an inference system 331, a robot 332, storage 321, an acquisition unit 301, a calculation unit 302, a determination unit 303, and a drive control unit 304.

The inference system 331 is a system for inferring control data of the robot 332 using a machine learning model. The inference system 331 uses a machine learning model that can adjust (set) the calculation cost at the time of inference by setting control parameters according to the calculation cost. Such a machine learning model is, for example, a model that can be set so that the inference accuracy is decreased as the calculation cost is decreased. As such a machine learning model, a machine learning model of which the size can be arbitrarily changed as described in the first and second embodiments can be used. In this case, the inference system 331 can be a system including the inference device 10 of the first embodiment or a system including the inference system 100 of the second embodiment.

Applicable machine learning models are not limited to these, and any model may be used as long as the model is a machine learning model that can adjust (set) the calculation cost at the time of inference. For example, a model that can perform inference by specifying an arbitrary channel width, which is described in Jiahui Yu, Thomas Huang, "Universally Slimmable Networks and Improved Training Techniques", in arXiv:1903.05134v1 12 Mar. 2019 (Non-patent Literature 1), and a model that can specify the operation in the depth direction at the time of inference with an arbitrary step width, which is described in Ricky T. Q. Chen, Yulia Rubanova, Jesse Bettencourt, David Duvenaud, "Neural Ordinary Differential Equations", in arXiv: 1806.07366v4 15 Jan. 2019 (Non-patent Literature 2) may be used.

The robot 332 is a robot of which the drive is to be controlled. The robot 332 may be any robot, for example, a picking robot and a moving robot (mobile robot). The picking robot is a robot having a function of gripping (picking) a target object. For example, the picking robot is a robot that grips and takes out a product from a basket in which a plurality of products (an example of a target object) are placed. The mobile robot is, for example, a robot that moves while carrying a basket (an example of an object mounted on the robot) in which products are placed. The robot 332 may be a robot having functions of both the picking robot and the mobile robot.

The storage 321 stores various kinds of data used in various kinds of processing executed by the robot system 300. For example, the storage 321 stores parameters (weights, biases, and the like) that define a machine learning model (neural network), data acquired by the acquisition unit 301, and the like. The storage 321 can be configured by any commonly used storage medium such as a flash memory, a memory card, a random access memory (RAM), a hard disk drive (HDD), and an optical disk.

The acquisition unit 301 acquires various kinds of data used in various kinds of processing executed by the robot system 300. For example, the acquisition unit 301 acquires data (an example of first input data) predetermined as data that affects the operation of the robot. Hereinafter, this data is referred to as external data. For example, the acquisition unit 301 acquires the external data obtained in advance from the outside of the robot system 300. In a case where the picking robot is used, the external data includes, for example, at least one of the number of target objects (such as the total number of products in the basket), the number of types of target objects (such as the number of types of products in the basket), the weight of the target object, and a success rate of gripping the target object (distribution indicating the relationship between the calculation cost calculated in the past for the target object and the success rate of gripping at that time).

The acquisition unit 301 may acquire at least part of the external data from other data (may be other external data) by calculation or estimation. For example, the acquisition unit 301 may estimate the number of target objects, the number of types of target objects, and the like by acquiring a captured image obtained by imaging the target object and analyzing the captured image.

The acquisition unit 301 acquires data that the inference system 331 uses for inference, that is, input data to the machine learning model (an example of second input data). This data is, for example, a captured image obtained by imaging the target object to be gripped, but is not limited thereto, and may be any data. For example, the type of the target object (such as the type of the product to be picked) may be used together with the captured image as the input data to the machine learning model. An imaging device (such as a camera) that captures a captured image may be provided in the robot system 300 or may be provided outside the robot system 300. In the latter case, the acquisition unit 301 may acquire a captured image from an imaging device provided outside.

The external data (first input data) and the data used for inference (second input data) may be the same. For example, in the case of a configuration in which the number of target objects is estimated from the captured image and inference is performed by inputting the captured image, both the external data and the data used for inference are captured images.

The calculation unit 302 calculates the calculation cost of inference processing using a machine learning model on the basis of the external data. For example, the calculation unit 302 calculates calculation cost corresponding to a value obtained by inputting the total number of products in the basket, the number of types of products in the basket, the value of the weight of the product to be picked, or an expected value of the distribution of the success rate of gripping the target object (distribution indicating the relationship between the calculation cost calculated in the past and the success rate of gripping) to the previously obtained function (primary function, quadratic function, or the like). The calculation cost is, for example, the number of multiplications, but is not limited thereto. The coefficient and bias that determine the function may be determined empirically, or may be obtained by optimization using machine learning or the like in consideration of the success rate of gripping and the calculation speed (throughput).

When the total number of products in the basket is increased, the calculation cost for inferring the position where the product is gripped while maintaining accuracy may be increased. In this way, it is considered that the total number of products in the basket, the number of types of products in the basket, the value of the weight of the product to be picked, and the like are external data that makes inference processing more difficult as the value is increased. Therefore, it can also be interpreted that the calculation unit 302 calculates the calculation cost of the inference processing according to the external data representing the difficulty level of the inference processing. In this case, the coefficient of the function becomes a positive value so that the calculation cost is increased as the value of the external data (difficulty level) is increased.

In a case where the distribution of the success rate of gripping the target object is used as the external data, the calculation unit 302 may obtain the calculation cost corresponding to the designated success rate from the distribution.

The determination unit 303 determines a control parameter of the machine learning model for executing inference according to the calculated calculation cost. For example, in a case where the machine learning model of the first embodiment (second embodiment) is used, the determination unit 303 determines a model size according to the calculation cost. In a case where a model as described in Non-patent Literature 1 is used, the determination unit 303 determines a channel width according to the calculation cost. In a case where a model as described in Non-patent Literature 2 is used, the determination unit 303 determines a step width according to the calculation cost.

The inference system 331 functions as an inference unit that infers control data using the machine learning model set according to the calculation cost. For example, the inference system 331 infers control data using the machine learning model set according to the control parameter determined by the determination unit 303. In a case where the machine learning model of the first embodiment (second embodiment) is used, the inference system 331 (the change unit 15 of the inference device 10) changes the machine learning model (the first machine learning model), which is a machine learning model before change, to the second machine learning model according to the control parameter. In addition, the inference system 331 (the inference unit 17 of the inference device 10) performs inference on the input data (second input data) using the changed second machine learning model.

The drive control unit 304 controls the drive of the robot 332 using the control data inferred by the inference system 331. For example, in a case where the robot 332 is a picking robot, the drive control unit 304 controls the drive of the robot 332 so that the target object is gripped at the gripping point estimated by the machine learning model.

Note that the robot system 300 may further include a learning unit that learns a machine learning model. In a case where the inference system 100 of the second embodiment is applied to the inference system 331, the learning device 20 in the inference system 100 can be used as the learning unit.

Each of the above-described units (the acquisition unit 301, the calculation unit 302, the determination unit 303, the drive control unit 304, the inference system 331) may be physically provided in one device or may be physically distributed in a plurality of devices. For example, the robot system 300 may be configured to include a device including the inference system 331 and a device including the acquisition unit 301, the calculation unit 302, the determination unit 303, the drive control unit 304, and the storage 321 as physically different devices.

Each unit provided in each device is realized by, for example, one or a plurality of processors. For example, each of the above-described units may be realized by causing a processor such as a central processing unit (CPU) to execute a program, that is, by software. Each of the above-described units may be realized by a processor such as a dedicated integrated circuit (IC), that is, by hardware. Each of the above-described units may be realized by using software and hardware together. In a case where a plurality of processors is used, each processor may realize one of the respective units, or may realize two or more of the respective units.

Figure 9:
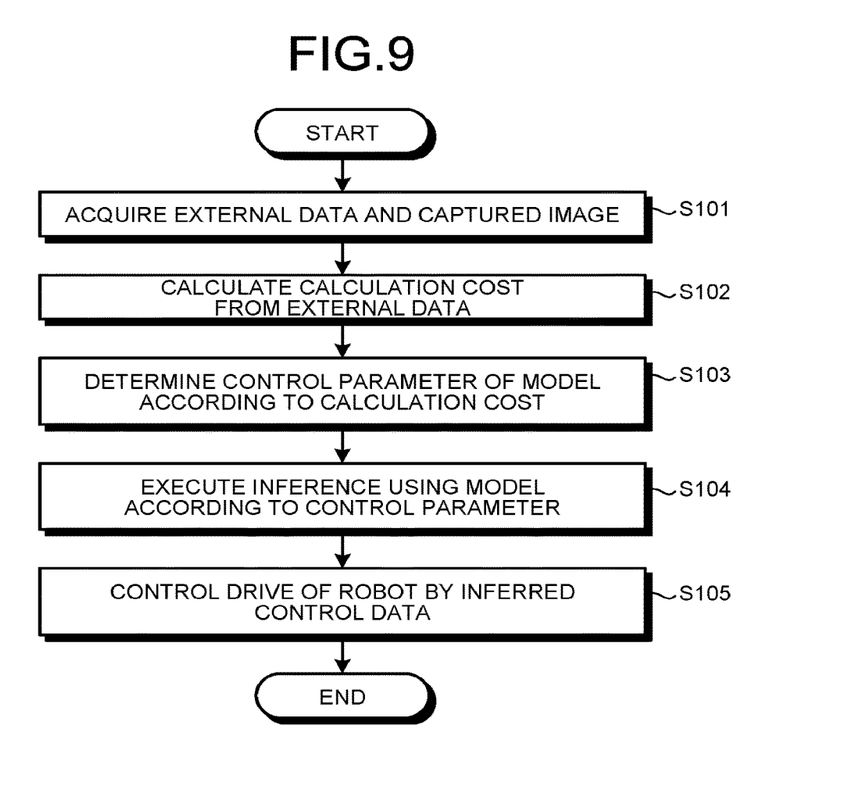
FIG. 9 is a flowchart of drive processing in the third embodiment.

Next, drive processing by the robot system 300 according to the third embodiment configured in this manner will be described. FIG. 9 is a flowchart illustrating an example of drive processing in the third embodiment.

The acquisition unit 301 acquires external data and a captured image (step S101). The captured image is an example of data used for inference, and may be any other data. The calculation unit 302 calculates the calculation cost of the inference processing using the machine learning model from the acquired external data (step S102). The determination unit 303 determines a control parameter of the machine learning model for executing inference according to the calculated calculation cost (step S103). The determination unit 303 determines a control parameter such as a model size, a channel width, or a step width, for example, according to the calculation cost.

The inference system 331 infers control data using a machine learning model set according to the determined control parameter (step S104). For example, in a case where the inference system 331 is the inference device 10 of the first embodiment, the change unit 15 of the inference device 10 changes the first machine learning model to the second machine learning model according to the control parameter. Then, the inference unit 17 of the inference device 10 performs inference on the acquired captured image using the changed second machine learning model.

The drive control unit 304 controls the drive of the robot 332 using the inferred control data (step S105).

As described above, according to the third embodiment, inference can be executed using a single machine learning model that calculates the calculation cost for inference using the external data and can set the control parameter according to the calculated calculation cost. Thereby, for example, even an edge device with limited memory resources can appropriately adjust the inference accuracy and the calculation cost.

Modification Example

In addition, this embodiment is not limited to the above-described embodiments, and can be changed in a range not departing from the gist of the invention.

For example, in a case where the robot 332 is a mobile robot, the following external data may be used.

Width of route to move
Number (density) of surrounding objects (other robots, obstacles, and the like)
Number of objects (baskets and the like) to be mounted
Number of types of objects to be mounted
Weight of object to be mounted
Weight of target object (product in the basket and the like) to be mounted The robot system 300 may be a system (multitask system) that controls the drive of a robot using a plurality of machine learning models. For example, the robot system 300 may be configured to use a machine learning model that infers control data for gripping the target object and a machine learning model that infers control data for movement.

In this case, the calculation unit 302 may calculate a final calculation cost by normalizing a plurality of calculation costs respectively calculated for a plurality of machine learning models. For example, the following calculation method can be applied.

(1) Calculate a calculation cost for each machine learning model, and correct the calculation cost for each machine learning model according to a ratio of the calculation costs so that the total calculation cost is within the upper limit.

(2) Input a plurality of pieces of external data corresponding to each machine learning model, and calculate the calculation cost of each machine learning model so that the calculation cost does not exceed the upper limit.

In a case where the robot system 300 includes the learning unit, the learning unit may learn the machine learning model in consideration of the calculation cost. For example, the learning unit learns the machine learning model using the loss function according to the calculation cost. The loss function is a function that has a large influence on the accuracy of inference with a high calculation cost in a case where the calculation cost (or the value of external data indicating the difficulty level) is high, and has a large inference on accuracy of inference with a low calculation cost in a case where the calculation cost is low.

Figure 10:
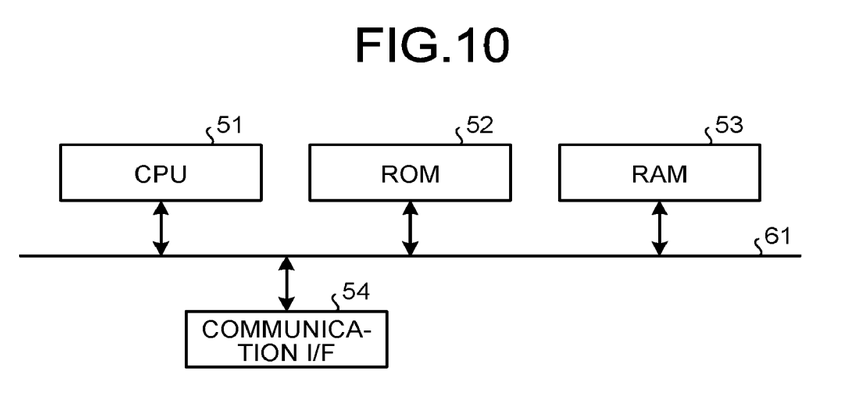
FIG. 10 is a hardware configuration diagram of a device according to the first to third embodiments.

Next, the hardware configuration of each device (the learning device, the inference device, the device constituting the robot system, or the like) according to the first to third embodiments will be described with reference to FIG. 10. FIG. 10 is an explanatory diagram illustrating a hardware configuration example of a device according to the first to third embodiments.

A device according to the first to third embodiments includes a control device such as a CPU 51, a storage device such as a read only memory (ROM) 52 or a RAM 53, a communication I/F 54 that is connected to a network to perform communication, and a bus 61 that connects respective units.

A program executed by the device according to the first to third embodiments is provided by being installed in advance in the ROM 52 or the like.

The program executed by the device according to the first to third embodiments may be provided as a computer program product by being recorded as a file in an installable format or an executable format in a computer-readable recording medium such as a compact disk read only memory (CD-ROM), a flexible disk (FD), a compact disk recordable (CD-R), and a digital versatile disk (DVD).

Further, the program executed by the device according to the first to third embodiments may be provided by being stored in a computer connected to a network such as the Internet and downloaded via the network. The program executed by the device according to the first to third embodiments may be provided or distributed via a network such as the Internet.

The program executed by the device according to the first to third embodiments can cause a computer to function as each unit of the above-described device. In this computer, the CPU 51 can read and execute a program from a computer-readable storage medium onto a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robot system, comprising:
one or more processors configured to
acquire first input data predetermined as data affecting an operation of a robot;
calculate, based on the first input data, a calculation cost of inference processing required for a machine learning model to infer control data used for controlling the robot;
infer the control data by the machine learning model, which is set according to the calculated calculation cost; and
control the robot using the inferred control data,
wherein the one or more processors are further configured to calculate the calculation cost using one of a previously obtained function that inputs the first input data and outputs the calculation cost, or a distribution indicating a relationship between a plurality of calculation costs and a plurality of pieces of first input data.

2. The robot system according to claim 1, wherein the one or more processors are further configured to:
determine a control parameter of the machine learning model for executing inference according to the calculated calculation cost;
change the machine learning model according to the determined control parameter; and
infer the control data using the changed machine learning model.

3. The robot system according to claim 1,
wherein the robot is a picking robot that grips a target object, and
the first input data is at least one of a number of target objects, a number of types of target objects, a weight of a target object, and a success rate of gripping the target object.

4. The robot system according to claim 1,
wherein the robot is a moving robot, and
the first input data is at least one of a width of a route that the robot moves, a number of objects around the robot, a number of objects mounted on the robot, a number of types of objects mounted on the robot, and a weight of an object mounted on the robot.

5. The robot system according to claim 1, wherein the machine learning model is a model that is set such that an inference accuracy is decreased as the calculated calculation cost is decreased.

6. The robot system according to claim 1, wherein the one or more processors are further configured to learn the machine learning model using a loss function according to the calculated calculation cost.

7. The robot system according to claim 1, wherein the one or more processors are further configured to infer the control data by inputting second input data, different from the first input data, to the machine learning model.

8. A driving method, comprising:
acquiring first input data predetermined as data affecting an operation of a robot;

calculating, based on the first input data, a calculation cost of inference processing required for a machine learning model to infer control data used for controlling the robot;
inferring the control data by the machine learning model set according to the calculation cost; and
controlling the robot using the inferred control data,
wherein the calculation step comprises calculating the calculation cost by using one of a previously obtained function that inputs the first input data and outputs the calculation cost, or a distribution indicating a relationship between a plurality of calculation costs and a plurality of pieces of first input data.

9. The robot system according to claim 1, wherein for the machine learning model, the one or more processors are configured to set a control parameter according to the calculated calculation cost, the control parameter being a size of the machine learning model, a channel width, or a step width.

* * * * *